United States Patent

Tanaka et al.

[15] 3,637,461

[45] Jan. 25, 1972

[54] PROCESS FOR PRODUCING FATTY ACID ESTERS OF SUGARS

[72] Inventors: Katsunobu Tanaka; Takeo Suzuki, both of Machida-shi, Japan

[73] Assignee: Kyowa Hakko Kogyo Co., Ltd., Tokyo, Japan

[22] Filed: Jan. 31, 1969

[21] Appl. No.: 795,738

[30] Foreign Application Priority Data

Feb. 1, 1968 Japan........................................43/5735

[52] U.S. Cl. ........................................................195/28 R
[51] Int. Cl. ..................................................C12d 13/00
[58] Field of Search........................................195/28, 30

[56] References Cited

UNITED STATES PATENTS 3,219,543  11/1965  Douros et al. .............................195/1
3,409,506  11/1968  Stevens et al. ............................195/28

OTHER PUBLICATIONS

Shaw et al., Nature, Vol. 217, p. 142 January 13, 1968 Tulloch et al., Canadian J. Chemistry, Vol. 40, p. 1326 (1962)
Lennarz, Journal of Biological Chemistry, Vol. 239, p. PC 3110 1964.
Anderson et al., Journal of Biological Chemistry, Vol. 101, p 499 (1933)

*Primary Examiner*—A. Louis Monacell
*Assistant Examiner*—Seymour Rand
*Attorney*—Craig, Antonelli & Hill

[57] ABSTRACT

A process for producing fatty acid esters of sugars by fermentation which comprises culturing a hydrocarbon-assimilating micro-organism under aerobic conditions in an aqueous nutrient medium containing hydrocarbons as the main source of carbon. Good yields are obtained using n-paraffins of six to 25 carbon atoms or kerosene as the hydrocarbon in the medium. Exemplary micro-organisms are those belonging to the genus *Arthrobacter, Brevibacterium, Micrococcus, Corynebacterium, Mycobacterium, Candida,* or *Aspergillus.*

15 Claims, No Drawings

PROCESS FOR PRODUCING FATTY ACID ESTERS OF SUGARS

This invention relates to a process for producing fatty acid esters of sugars. More particularly, it relates to a process for the production of fatty acid esters of sugars by fermentation. Even more particularly, the invention relates to a process for producing fatty acid esters of sugars by fermentation with micro-organisms which are capable of utilizing hydrocarbons.

The present inventors have found that micro-organisms capable of growing by means of the utilization of hydrocarbons generally have surface active substances in the cells or on the surface of the cells thereof. Furthermore, it has been confirmed by extracting and identifying these substances that they are fatty acid esters of various sugars. Esters of sugars are widely used as surface active agents and in various industries. Accordingly, there is a need in the art for a fermentation process for producing fatty acid esters of sugars inexpensively and in a short period of time.

One of the objects of the present invention is to provide a process for producing fatty acid esters of sugars.

Another object of the present invention is to provide a process for producing fatty acid esters of sugars by fermentation which may be carried out in an efficacious and relatively simple manner.

A further object of the invention is to provide a process for producing fatty acid esters of sugars by fermentation which may be carried out advantageously on an industrial scale at low cost to give a high yield of product.

A still further object of the invention is to provide fatty esters of sugars.

These and other objects and advantages of the present invention will become apparent to those skilled in the art from a consideration of the following specification and claims.

As the result of investigation on the production of various sugar esters by fermentation with the use of micro-organisms from inexpensive starting materials, the present inventors have found, in accordance with the present invention, that significant quantities of fatty acid esters of sugars are produced and accumulated in the fermentation liquor when micro-organisms capable of utilizing hydrocarbons are cultured in an aqueous nutrient medium under aerobic conditions. A large variety of micro-organisms may be employed in the present invention. As noted above, the micro-organisms should be capable of assimilating and utilizing hydrocarbons. Examples of micro-organisms suitable for carrying out the present invention are as follows:

Arthrobacter paraffineus
Arthrobacter roseoparaffinus
Arthrobacter hydrocarboclastus
Arthrobacter simplex
Brevibacterium ketoglutamicum
Micrococcus paraffinolyticus
Corynebacterium hydrocarboclastus
Corynebacterium fascians
Coryhebacterium pseudodiphtheriticum
Corynebacterium fascians
Mycobacterium smegmatis
Candida lipolytica
Aspergillus oryzae As is clear from the above list, micro-organisms which produce and accumulate fatty acid esters of sugars utilizing hydrocarbons as the carbon source exist widely irrespective of genus and family.

Either a synthetic culture medium or a natural nutrient medium is suitable for the cultivation of the strains employed in the present invention as long as it contains the essential nutrients for the growth of the strain employed. Such nutrients are well known in the art and include substances such as a carbon source, a nitrogen source, inorganic compounds and the like which are utilized by the micro-organism employed in appropriate amounts.

The fermentation in connection with the present invention is conducted in an aqueous nutrient medium containing a hydrocarbon or a mixture of hydrocarbons as the main carbon source. Such hydrocarbons include straight and branched-chain paraffins (alkanes) having from six to 25 carbon atoms, such as n-hexane, n-octane, n-decane, n-dodecane, n-hexadecane, n-eicosane, isooctane, etc., cycloparaffins such as cyclohexane and cyclooctane, straight- and branched-chain olefins such as hexene-1, ocetene-1, octene-2, etc., cycloolefins such s cyclohexene, aromatic hydrocarbons such as benzene, the isomeric xylenes, etc., and mixtures thereof and hydrocarbons derived from petroleum such as kerosene, light oils, heavy oils, paraffin oils, etc. Small amounts of other carbon sources such as carbohydrates, for example, glucose, fructose, maltose, sucrose, starch, starch hydrolysate, molasses, etc., or any other suitable carbon source such as organic acids, for example, acetic acid, lactic acid, etc., may be used in the fermentation medium along with the hydrocarbon. These substances may also be used either singly or in mixtures of two or more.

As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, etc., or natural substances containing nitrogen, such as corn steep liquor, yeast extract, meat extract, peptone, fish meal, bouillon, casein hydrolysates, casamino acid, fish soulables, rice bran extract, etc., may be employed. Again, these substamces may be used either singly or in combinations of two or more.

Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc.

Moreover, in the case of certain strains, it may also be necessary to add certain essential nutrients to the culture medium, such as amino acids, for example, aspartic acid, threonine, methionine, etc., and/or vitamins, for example, biotin, thiamine, cobalamin and the like. substances In conducting culturing in accordance with the present invention, the fermentation medium is sterilized and then the micro-organism to be employed is inoculated therein. Culturing is conducted under aerobic conditions, such as aerobic shaking of the culture or with stirring and aeration of a submerged culture, at a temperature of, for example, about 25° to 40° C. and at a pH of, for example, about 4 to 9. During cultivation, the pH is adjusted to the recited range (preferably 6 – 8 ) by adding, for example, urea solution, ammonia water or ammonium carbonate solution to the medium. Fermentation is completed usually in 2 to 4 days. In practice, the fermentation is terminated when the measurement value of total esters shows a maximum.

The product fatty acid esters of sugars accumulate predominately in the oily layer part of the fermentation liquor. Accordingly, after the completion of fermentation, the aqueous part of the lower layer of the fermentation liquor is removed by letting the fermentation liquor stand still in a cold room or by using centrifugal separation. A chloroform-methanol (1 : 1 ) mixture solution is added to the upper layer part so as to extract the total lipids therefrom. The solvent is removed at 40° C. under reduced pressure and, then, the oily part of the upper layer is recovered by centrifugal separation. The thus-obtained oil layer is passed through a silica-gel column and is eluted with hexane in order to remove the n-paraffins contained therein. Subsequently, polar compounds are removed by elution with chloroform. The fatty acid esters of sugars are recovered after conducting elution with chloroform-methanol mixture solution, gathering the respective fractions, removing the solvent, adding cold acetone gathering the resulting precipitates and finally purifying with acetone.

The following examples are given merely as illustrative of the present invention and are not to be considered as limiting. Unless otherwise noted, the percentages therein and throughout the application are by weight per liter of fermentation liquor. Although particular micro-organism strains are exemplified therein, it is to be understood that any other of the micro-organisms or mutants thereof having the properties described hereinabove may be used.

EXAMPLE 1

*Arthrobacter paraffineus* ATCC 15591 is cultured in a seed medium containing 1.0 percent meat extract, 1.0 percent peptone and 0.3 percent sodium chloride, a medium having a pH of 7.2 before sterilization, with aerobic shaking for 24 hours. The resultant seed culture is inoculated in the ratio of 10 percent by volume into 3.0 liters of a fermentation medium contained in a 5 -liter jar fermentor and having the following composition:

| | |
|---|---|
| 0.2% | $K_2HPO_4$ |
| 0.1% | $MgSO_4 \cdot 7H_2O$ |
| 0.002% | $MnSO_4 \cdot 4H_2O$ |
| 0.02% | $FeSO_4 \cdot 7H_2O$ |
| 0.001% | $ZnSO_4 \cdot 7H_2O$ |
| 1 mg./l. | $CuCl_2 \cdot 2H_2O$ |
| 1.0% | $NH_4NO_3$ |
| 0.1% | cornsteep liquor |

Culturing is conducted at 30° C. with agitation at the rate of 600 r.p.m. and with aeration with sterile air at the rate of one liter per liter per minute for 80 hours. At the beginning of culturing, 600 ml. of a mixture of $C_{11}$—$C_{18}$ n-paraffins is added to the culture medium, and the pH of the medium is adjusted to 6.8 -7.5 with ammonia water. After the completion of fermentation, 2.5 liters of the fermentation liquor is separated by means of a centrifuge, and the water-soluble part of the lower layer is removed by suction. To 0.4 liter of the upper layer part, a fivefold mixture solution of chloroform-methanol (1 : 1 ) is added. After extracting with agitating at room temperature for 30 minutes the upper layer part is filtered. The resultant precipitates are washed with the above-mentioned solvent. The filtrate and washed solution are mixed and adjusted to a volume of 3.2 liters. Then, the solvent contained therein is removed at 40° C. under reduced pressure, and the solution is heated and separated with a centrifuge. The upper layer is recovered and n-hexane is added thereto. The, the resulting solution is filuted to 250 ml. and passed through a silica-gel column (5.2×20 cm.). Subsequently, n-hexane is passed through the column in order to flush out any remaining n-paraffins. Thereafter, chloroform is passed through the column in order to remove nonpolar substances. After gathering the fractions (600 ml. eluted with the chloroform-methanol (95:5) mixture solution, removing the solvent at 40° C. under reduced pressure, adding warm acetone to dissolve the mixture and letting it stand still in a cold room, a precipitate having a jelly state is recovered. When the procedure of dissolution with acetone and precipitation is repeated similarly as described above, 5.3 g. of a pale yellow jellylike substance is obtained.

As the result of conducting various identification tests, the product obtained is determined to be a mixture of esters having one ester bond per one molecule of glucose and two ester bonds per one molecule of trehalose with a higher fatty acid (arthronic acid) having a hydroxy group at $\beta$-position and a branching at the $\alpha$-position. The product has the property of being capable of dispersing mixtures of water and mineral oil or water and n-paraffins extremely effectively.

EXAMPLE 2

*Corynebacterium hydrocarboclastus* ATCC 15592 is cultured in the same fermentation medium and under the same conditions as described in example 1, except that a $C_{11}$—$C_{14}$ n-paraffin-mixture is used as the carbon source. Culturing is conducted in a 5-liter jar fermentor. After 72 hours of culturing, 2.3 liters of the resulting fermentation liquor is treated in the same manner as in example 1. Consequently, 0.65 liter of an oil layer part is obtained. 4.5 liters of a mixture solution of ethanol-ether (2:1) is added thereto and, after mixing sufficiently, the solution is filtered. 5.1 liters of the orange-yellow extraction solution is heated to 40° C. under reduced pressure so as to remove the solvent therefrom and, after the residual solution is heated, the transparent solution of the upper layer is recovered by centrifugal separation. Subsequently, a column chromatography procedure is conducted as described in example 1. As a result, 3.6 g. of an ester of trehalose with a fatty acid having an experimental formula of $C_{20}H_{41}O_2$ is separated as a single substance. In addition, 0.2 g. of a fatty acid ester of glucose is separated.

EXAMPLE 3

*Micrococcus epidermidis* ATCC 155 is cultured in a culture medium containing 2 percent sorbitol, 1 percent peptone, 1 percent meat extract and 0.3 percent sodium chloride with aerobic shaking for 24 hours using an n-paraffin mixture containing $C_{12}$—$C_{15}$ fractions as a carbon source in the same manner as described in example 1. The resultant seed culture is inoculated in the ratio of 10 percent by volume into a fermentation medium having the following composition:

| | |
|---|---|
| 10% | kerosene |
| 0.2% | $K_2HPO_4$ |
| 0.2% | $KH_2PO_4$ |
| 0.1% | $MgSO_4 \cdot 7H_2O$ |
| 0.005% | $MnSO_4 \cdot 4H_2O$ |
| 0.01% | $FeSO_4 \cdot 7H_2O$ |
| 1 mg./l. | $CuSO_4 \cdot 5H_2O$ |
| 1.0% | $(NH_4)_2SO_4$ |
| 0.1% | cornsteep liquor |
| 20 γ/. | thiamine |

The pH thereof is adjusted to 7.5 (before sterilization).

Culturing is carried out with aerobic shaking of the culture at 30° C. in a 5-liter jar fermentor according to the same method described in example 1. Recovery and purification of the product are conducted by the same procedure as in example 2. As a result, 6.3 g. of a sugar-ester mixture with the ester bond of trehalose as the constituent sugar and 2 moles of arthronic acid is obtained.

EXAMPLE 4

*Mycobacterium sp.* ATCC 12297 is used as the seed microorganism and it is cultured in a seed medium prepared by adding 5 percent of n-paraffins to the composition of the seed medium described in example 2. The seed culture is conducted with aerobic shaking for 24 hours. The resultant seed culture is inoculated into the same fermentation medium and is cultured under the same conditions as described in example 1. After the completion of fermentation after 4 days, 2.3 g. of the ester of trehalose with a monocarboxylic acid, having the experimental formula $C_{32}H_{64}O_2$, is recovered from 1.6 liters of the fermentation liquor.

EXAMPLE 5

*Arthrobacter roseoparaffinus* ATCC 15584 is cultured for 72 hours in the same manner as described in example 3. Separated from the resultant fermentation liquor are 1.2 g./l. of stearic acid diester of trehalose, 0.3 g./l. of the arthronic acid monoester of glucose and 1.3 g. of a mixture of stearic acid mono- and tri-esters of sucrose.

EXAMPLE 6

Example 4 is repeated except that *Micrococcus paraffinolyticus* ATCC 15582 is used as a seed strain in place of *Mycobacterium sp.* ATCC 12297, whereby 3.5 g. of the ester of trehalose with a monocarboxylic acid, having the experimental formula $C_{32}H_{64}O_2$, is recovered from 1.6 liters of the resultant fermentation liquor.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for producing fatty acid esters of glucose, trehalose or sucrose which comprises culturing a hydrocarbon-assimilating micro-organism capable of producing said esters and belonging to a genus selected from the group consisting of *Arthrobacter*, *Brevibacterium*, *Micrococcus*, *Corynebacterium*, *Mycobacterium*, *Candida* and *Aspergillus* under aerobic conditions in an aqueous nutrient medium containing a hydrocarbon or a mixture of hydrocarbons as the main carbon source, accumulating the fatty acid esters in the resultant culture liquor and recovering said fatty acid esters therefrom.

2. The process of claim 1 wherein said hydrocarbon is an n-paraffin having from six to 25 carbon atoms.

3. The process of claim 1 wherein said hydrocarbon is kerosene.

4. The process of claim 1, wherein culturing is carried out at a temperature of about 25° to 40° C. and at a pH of about 4 to 9.

5. A process for producing fatty acid esters of glucose, trehalose or sucrose which comprises culturing a hydrocarbon-assimilating micro-organism capable of producing said esters and belonging to a genus selected from the group consisting of *Arthrobacter*, *Brevibacterium*, *Micrococcus*, *Corynebacterium*, *Mycobacterium*, *Candida* and *Aspergillus* under aerobic conditions at a temperature of about 25° to 40° C. and at a pH of about 4 to 9 in an aqueous nutrient medium containing a hydrocarbon or a mixture of hydrocarbons as the main carbon source, accumulating the fatty acid esters in the resultant culture liquor, and recovering said fatty acid esters therefrom.

6. The process of claim 5, wherein said hydrocarbon is an n-paraffin having from six to 25 carbon atoms.

7. The process of claim 5 wherein said hydrocarbon is an n-paraffin having from 11 to 18 carbon atoms.

8. The process of claim 5, wherein said hydrocarbon is kerosene.

9. The process of claim 5, wherein said fatty acid esters are recovered from the oil layer part of the resultant fermentation liquor.

10. The process of claim 5, wherein said micro-organism is *Arthrobacter paraffineus* ATCC 15591.

11. The process of claim 5, wherein said micro-organism is *Corynebacterium hydrocarboclastus* ATCC 15592.

12. The process of claim 5, wherein said micro-organism is *Micrococcus epidermidis* ATCC 155.

13. The process of claim 5, wherein said micro-organism is *Mycobacterium sp.* ATCC 12297.

14. The process of claim 5, wherein said micro-organism is *Arthrobacter roseoparaffinus* ATCC 15584.

15. The process of claim 5, wherein said micro-organism is *Micrococcus paraffinolyticus* ATCC 15582.

* * * * *